(12) United States Patent
Nagai et al.

(10) Patent No.: US 6,261,642 B1
(45) Date of Patent: Jul. 17, 2001

(54) HIGH-SOLIDS COATING COMPOSITION AND METHOD FOR FORMING TOPCOAT USING THE SAME

(75) Inventors: Kenichi Nagai; Masaaki Saika; Haruhiko Aida, all of Hiratsuka; Motoshi Yabuta, Hadano; Hiroshi Igarashi; Yasumasa Okumura, both of Yokohama, all of (JP)

(73) Assignee: Kansai Paint Co., Ltd., Amagasaki (JP)

( * ) Notice: Subject to any disclaimer, the term of this patent is extended or adjusted under 35 U.S.C. 154(b) by 0 days.

(21) Appl. No.: 09/462,383

(22) PCT Filed: Jul. 3, 1998

(86) PCT No.: PCT/JP98/02997

§ 371 Date: Jan. 7, 2000

§ 102(e) Date: Jan. 7, 2000

(87) PCT Pub. No.: WO99/02619

PCT Pub. Date: Jan. 21, 1999

(51) Int. Cl.[7] .......................................................... B05D 1/36
(52) U.S. Cl. ...................... 427/407.1; 427/409; 428/447; 428/450; 428/457; 525/100; 525/101
(58) Field of Search ..................................... 525/100, 101; 427/407.1, 409; 428/447, 450, 457

(56) References Cited

FOREIGN PATENT DOCUMENTS

| 60-048172 | * | 3/1985 | (JP) . |
| 2-075649 | * | 3/1990 | (JP) . |
| 2-232221 | * | 9/1990 | (JP) . |
| 5-345879 | * | 12/1993 | (JP) . |
| 6-136324 | * | 5/1994 | (JP) . |
| 99/03939 | * | 1/1999 | (WO) . |

* cited by examiner

*Primary Examiner*—Erma Cameron
(74) *Attorney, Agent, or Firm*—Armstrong, Westerman, Hattori, McLeland & Naughton, LLP

(57) ABSTRACT

This invention provides a thermosetting high solids coating composition comprising:

(A) a copolymer prepared by polymerizing monomer components comprising (a) 30 to 50 wt. % of vinyltrimethoxysilane and/or vinyltriethoxysilane, (b) 5 to 15 wt. % of N-methylol(meth)acrylamide alkyl ether and (c) 35 to 65 wt. % of another polymerizable unsaturated monomer, (B) a hydroxyl-containing resin having a hydroxyl value of 10 to 200 mg KOH/g, and (C) a curing catalyst. This invention further provides a method for forming a topcoat using said composition. The composition of the invention achieves the following remarkable effects: it forms a coating film excellent in acid resistance and scratch resistance, and it is superior in storage stability and recoat adhesion.

13 Claims, No Drawings

HIGH-SOLIDS COATING COMPOSITION AND METHOD FOR FORMING TOPCOAT USING THE SAME

TECHNICAL FIELD

The present invention relates to a novel thermosetting high solids coating composition and a method for forming a topcoat using the same.

BACKGROUND ART

Thermosetting topcoat compositions comprising a hydroxyl-containing acrylic resin and a melamine resin have been heretofore chiefly used for coating automotive exterior panels. However, in recent years, acid rain has posed a world-wide problem of etching and blots or like stains on coating films. With the widespread use of car washers, scratches made on coating films by car washers have presented another problem. In this situation, there is a need for topcoat compositions, particularly clear coat compositions, which are capable of forming coating films satisfactory in both acid resistance and scratch resistance.

Usually, the scratch resistance of a coating film can be improved by increasing the crosslinking density of the film. On the other hand, the acid resistance of a coating film can be improved by incorporating an acid resistant crosslinking system into the film. However, a method has been scarcely proposed for giving both acid resistance and scratch resistance to a coating film.

For example, Japanese Unexamined Patent Publication No. 222,753/1990 discloses that a coating film having high crosslinking density, and thus having high scratch resistance, can be obtained by baking an acrylic resin of a high hydroxyl value in the presence of a monomeric melamine resin and an acid catalyst. However, this crosslinking system has a drawback of poor acid resistance since the coating film crosslinked by a melamine resin readily decomposes when contacted with an acid.

Methods have been proposed for imparting both acid resistance and scratch resistance to a coating film by incorporating an acid-resistant crosslinking system to a less acid-resistant melamine resin crosslinking system. The proposed systems include, for example, a composite crosslinking system having a combination of carboxyl group/epoxy group/hydroxyl group/melamine resin (Japanese Unexamined Patent Publication No. 247,264/1990), a composite crosslinking system having a combination of hydroxyl group/alkoxysilyl group/melamine resin (WO91/16,383), etc. However, these systems do not always achieve satisfactory improvements in acid resistance because of the presence of a melamine resin.

On the other hand, melamine resin-free crosslinking systems have been proposed. The proposals include a crosslinking system having only a combination of carboxyl group/ epoxy group or carboxyl group/epoxy group/hydroxyl group (e.g., Japanese Unexamined Patent Publications Nos. 87,288/1987, 45,577/1990 and 287,650/1991). Yet, these systems have a shortcoming that the resulting coating films, although superior in acid resistance, are inferior in scratch resistance owing to the low crosslinking density of the cured film.

A resin composition comprising a carboxyl-containing acrylic polymer and an epoxy- and hydrolyzable silyl-containing compound is known as a crosslinking system having a combination of carboxyl group/epoxy group/ hydrolyzable silyl group (Japanese Unexamined Patent Publication No. 187,749/1987), but this composition has a defect that the curing reaction of the polymer with the compound is unsatisfactory because of the steric hindrance caused by the presence of the epoxy group and the hydrolyzable silyl group in the same molecule.

A resin composition comprising a hydroxyl- and carboxyl-containing silicone polymer, a carboxyl- and carboxylic acid ester group-containing polymer and a hydroxyl- and epoxy-containing polymer has been proposed as a crosslinking system having a combination of carboxyl group/epoxy group/hydroxyl group which contains the silicone polymer as a base resin (Japanese Unexamined Patent Publication No. 166,741/1994). However, the cured coating of the composition is defective in that it is not always fully satisfactory in crosslinking density and Is poor in the recoat adhesion that is one of the important characteristics of coating compositions for automotive exterior panels.

On the other hand, it is of urgent necessity in the field of coating compositions to take measures for the control on the use of organic solvents, from the viewpoints of prevention of air pollution and conservation of resources. Such measures include development of high solids coating compositions that contain a less amount of solvents and have a higher solids concentration.

DISCLOSURE OF THE INVENTION

An object of the present invention is to provide a novel thermosetting high solids coating composition free of the foregoing prior art drawbacks, and a method for forming a topcoat using said composition.

Another object of the invention is to provide a novel thermosetting high solids coating composition which is capable of forming a coating film excellent in both acid resistance and scratch resistance, and a method for forming a topcoat using said composition.

A further object of the invention is to provide a novel thermosetting high solids coating composition. excellent in storage stability and recoat adhesion, and a method for forming a topcoat using said composition.

Other objects and features of the invention will become apparent from the following description.

The present invention provides a thermosetting high solids coating composition comprising:

(A) a copolymer prepared by polymerizing monomer components comprising (a) 30 to 50 wt. % of vinyltrimethoxysilane and/or vinyltriethoxysilane, (b) 5 to 15 wt. % of N-methylol(meth)acrylamide alkyl ether and (c) 35 to 65 wt. % of another polymerizable unsaturated monomer, (B) a hydroxyl-containing resin having a hydroxyl value of 10 to 200 mg KOH/g, and (C) a curing catalyst.

The present invention also provides a method for forming a topcoat comprising the step of successively forming a colored base coat and a clear coat on a substrate, said colored base coat and/or clear coat being formed from the above coating composition.

The inventors of the present invention carried out extensive research to achieve the above objects, and found that the foregoing objects can be achieved with a thermosetting high solids coating composition comprising the above-specified copolymer (A), the hydroxyl-containing resin (B) and the curing catalyst (C). The present invention has been completed based on this novel finding.

The thermosetting high solids coating composition and the method for forming a topcoat according to the present invention will be described below in more detail.

The thermosetting high solids coating composition of the invention essentially comprises (A) a specific copolymer containing at least one hydrolyzable alkoxysilyl group selected from methoxysilyl and ethoxysilyl, and at least one alkyl-etherified N-methylol group, (B) a hydroxyl-containing resin having a specific hydroxyl value, and (C) a curing catalyst.

The copolymer (A) in the composition of the invention is a copolymer prepared by polymerizing 100 wt. % of monomer components consisting of (a) 30 to 50 wt. % of vinyltrimethoxysilane and/or vinyltriethoxysilane, (b) 5 to 15 wt. % of N-methylol(meth)acrylamide alkyl ether and (c) 35 to 65 wt. % of another polymerizable unsaturated monomer. A monomer (a) content of less than 30 wt. % in the copolymer is likely to lower the curability of the resulting composition and reduce the scratch resistance of the coating film. On the other hand, more than 50 wt. % of monomer (a) tends to decrease recoat adhesion. A monomer (b) content of less than 5 wt. % in the copolymer is likely to decrease recoat adhesion. On the other hand, more than 15 wt. % of monomer (b) is likely to cause yellowing of the film.

The copolymer (A) usually has a hydrolyzable alkoxysilyl content of 0.5 to 4.0 mmol/g, preferably 1.0 to 3.5 mmol/g, the hydrolyzable alkoxysilyl group being methoxysilyl and/or ethoxysilyl. The copolymer (A) usually has a number average molecular weight of 1,000 to 5,000, preferably 1,200 to 4,000. A hydrolyzable alkoxysilyl content of less than 0.5 mmol/g is likely to lower the curability of the resulting coating composition and reduce the acid resistance and scratch resistance of the coating film. On the other hand, a hydrolyzable alkoxysilyl content of more than 4.0 mmol/g tends to decrease the compatibility with the hydroxyl-containing resin (B). Hence a hydrolyzable alkoxysilyl content outside said range is undesirable. A number average molecular weight of less than 1,000 is likely to lower the curability of the resulting coating composition and reduce the acid resistance of the coating film. On the other hand, a number average molecular weight of more than 5,000 tends to decrease the compatibility with the hydroxyl-containing resin (B) and is unlikely to form a high solids coating composition. Hence a number average molecular weight outside said range is undesirable.

The copolymer (A) can be easily prepared by copolymerizing the monomer components consisting of the monomers (a), (b) and (c) in a conventional manner.

The monomer (a) is vinyltrimethoxysilane, vinyltriethoxysilane or a mixture of vinyltrimethoxysilane and vinyltriethoxysilane in any proportion.

The monomer (b) is a N-methylol(meth)acrylamide alkyl ether. It is preferable that the alkyl moiety have 1 to 4 carbon atoms. Particularly preferable are N-methylolacrylamide butyl ether and N-methylolacrylamide methyl ether.

Examples of polymerizable unsaturated monomers for use as the monomer (c) are (meth)acrylic acid esters, hydroxyl-containing unsaturated monomers, vinyl ethers and aryl ethers, olefin compounds and diene compounds, hydrocarbon ring-containing unsaturated monomers, nitrogen-containing unsaturated monomers, hydrolyzable alkoxylsilyl-containing acrylic monomer and the like.

Examples of (meth)acrylic acid esters are $C_{1-24}$ alkyl esters or cycloalkyl esters of acrylic or methacrylic acids, such as methyl acrylate, ethyl acrylate, propyl acrylate, isopropyl acrylate, n-butyl acrylate, isobutyl acrylate, t-butyl acrylate, hexyl acrylate, 2-ethylhexyl acrylate, n-octyl acrylate, decyl acrylate, stearyl acrylate, lauryl acrylate, cyclohexyl acrylate, methyl methacrylate, ethyl methacrylate, n-propyl methacrylate, isopropyl methacrylate, n-butyl methacrylate, isobutyl methacrylate, t-butyl methacrylate, hexyl methacrylate, 2-ethylhexyl methacrylate, octyl methacrylate, decyl methacrylate, lauryl methacrylate, stearyl methacrylate, cyclohexyl methacrylate, etc.; $C_{2-18}$ alkoxyalkyl esters of acrylic or methacrylic acids, such as methoxybutyl acrylate, methoxybutyl methacrylate, methoxyethyl acrylate, methoxyethyl methacrylate, ethoxybutyl acrylate, ethoxybutyl methacrylate, etc.; and the like.

Examples of the hydroxyl-containing monomers are $C_{2-8}$ hydroxyalkyl esters of acrylic or methacrylic acids, such as 2-hydroxyethyl (meth)acrylate, 3-hydroxypropyl (meth)acrylate, hydroxybutyl (meth)acrylate, etc.; monoesters of (meth)acrylic acid or like unsaturated carboxylic acids with polyethylene glycol, polypropylene glycol, polybutylene glycol or like polyether polyols; monoethers of 2-hydroxyethyl (meth)acrylate or like (meth)acrylic acid hydroxylalkyl esters with polyethylene glycol, polypropylene glycol, polybutylene glycol or like polyether polyols; mono esterification products or diesterification products of maleic anhydride, itaconic anhydride or like acid anhydride group-containing unsaturated compounds with ethylene glycol, 1,6-hexanediol, neopentyl glycol or like glycols; hydroxyethyl vinyl ether or like hydroxyalkyl vinyl ethers; allyl alcohols and the like; 2-hydroxypropyl (meth)acrylate; adducts of α,β-unsaturated carboxylic acid with CARDULA E10 (tradename, product of Shell Petrochemical Co., Ltd.), α-olefin epoxide or like monoepoxy compounds; and adducts of glycidyl (meth)acrylate with acetic acid, propionic acid, p-t-butylbenzoic acid, aliphatic acid or like monobasic acids; adducts of the above hydroxyl-containing unsaturated monomers with lactones (e.g., ε-caprolactone, γ-valerolactone, etc.); and the like.

Examples of vinyl ethers and aryl ethers are ethyl vinyl ether, n-propyl vinyl ether, isopropyl vinyl ether, butyl vinyl ether, t-butyl vinyl ether, pentyl vinyl ether, hexyl vinyl ether, octyl vinyl ether and like chain-like alkyl vinyl ethers; cyclopentyl vinyl ether, cyclohexyl vinyl ether and like cycloalkyl vinyl ethers; phenyl vinyl ether, trivinyl ether and like aryl vinyl ethers; benzyl vinyl ether, phenethyl vinyl ether and like aralkyl vinyl ethers; allyl glycidyl ether, allyl ethyl ether and like allyl ethers; etc.

Examples of olefin compounds and diene compounds are ethylene, propylene, butylene, vinyl chloride, butadiene, isoprene, chloroprene, etc.

Examples of hydrocarbon ring-containing unsaturated monomers are styrene, α-methylstyrene, phenyl (meth)acrylate, phenylethyl (meth)acrylate, phenylpropyl (meth)acrylate, benzyl (meth)acrylate, phenoxyethyl (meth)acrylate, cyclohexyl (meth)acrylate, 2-acryloyloxyethylhydrogen phthalate, 2-acryloyloxypropylhydrogen phthalate, 2-acryloyloxypropylhexahydrohydrogen phthalate, 2-acryloyloxypropyltetrahydrohydrogen phthalate, ester of p-t-butyl-benzoic acid with hydroxyethyl (meth)acrylate, dicyclopentenyl (meth)acrylate, etc.

Examples of nitrogen-containing unsaturated monomers are those other than monomer (b), e.g., nitrogen-containing alkyl (meth)acrylates such as N,N-dimethylaminoethyl (meth)acrylate, N,N-diethylaminoethyl (meth)acrylate, N-t-butylaminoethyl (meth)acrylate, etc.; polymerizable amides such as acrylamide, methacrylamide, N-methyl (meth)acrylamide, N-ethyl (meth)acrylamide, N,N-dimethyl (meth)acrylamide, N,N-dimethylaminopropyl (meth)acrylamide, N,N-dimethylaminoethyl (meth)acrylamide, etc.; aromatic nitrogen-containing monomers such as 2-vinylpyridine, 1-vinyl-2-pyrrolidone, 4-vinylpyridine, etc.; polymerizable nitriles such as acrylonitrile, methacrylonitrile, etc.; allylamines; and so on.

Examples of hydrolyzable alkoxysilyl-containing acrylic monomers are γ-(meth)acryloyloxypropyltrimethoxysilane, γ-(meth)acryloyloxypropylmethyldimethoxysilane, β-(meth)acryloyloxyethyltrimethoxysilane, γ-(meth)acryloyloxypropyltriethoxysilane, γ-(meth)acryloyloxypropylmethyldiethoxysilane, etc.

In copolymerization for preparing the copolymer (A) of the invention, it is preferable to use a $C_{1-24}$ alkyl ester or cycloalkyl ester of an acrylic or methacylic acid as the polymerizable monomer (c). It is more preferable to copolymerize a $C_{1-4}$ alkyl ester of an acrylic or methacrylic acid as the monomer (c).

The copolymerization can be carried out by conventional methods for copolymerization of unsaturated monomers. The most suitable method is solution type radical polymerization carried out in an organic solvent, in view of application range and costs. Stated more specifically, the desired polymer can be easily obtained by copolymerization at a temperature of about 60 to about 150° C. in an organic solvent in the presence of a polymerization initiator such as an azo catalyst, a peroxide catalyst or the like. Useful organic solvents include aromatic solvents such as xylene and toluene; ketone solvents such as methyl ethyl ketone and methyl isobutyl ketone; ester solvents such as ethyl acetate, butyl acetate, isobutyl acetate and 3-methoxybutyl acetate; and alcohols such as n-butanol and isopropyl alcohol, etc.

The hydroxyl-containing resin (B) in the composition of the invention contains at least one hydroxyl group in the molecule and has a hydroxyl value of 10 to 200 mg KOH/g, preferably 20 to 150 mg KOH/g.

A hydroxyl value of less than 10 mg KOH/g in the hydroxyl-containing resin (B) is likely to lower the curability of the resulting composition and to thereby reduce the acid resistance, scratch resistance and stain resistance of the coating film. On the other hand, a hydroxyl value of more than 200 mg KOH/g tends to decrease the water resistance of the coating film. Hence a hydroxyl value of the hydroxyl-containing resin (B) outside said range is undesirable.

Examples of hydroxyl-containing resin (B) include the following polymers (B-1) to (B-3).

(B-1): Hydroxyl-containing Acrylic Polymer

The hydroxyl-containing acrylic polymer for use has at least one hydroxyl group in the molecule. It is preferable for the polymer to have a number average molecular weight of 1,000 to 10,000. A number average molecular weight of less than 1,000 tends to impair the weatherability of the cured coating, whereas a number average molecular weight exceeding 10,000 tends to reduce the compatibility with the copolymer (A). Hence a number average molecular weight of the polymer (B-1) outside said range is undesirable.

The hydroxyl-containing acrylic polymer (B) can be easily prepared by copolymerizing an hydroxyl-containing unsaturated monomer and another polymerizable unsaturated monomer by a conventional method as mentioned above in the preparation of the copolymer (A).

Examples of hydroxyl-containing unsaturated monomers include those mentioned above in the preparation of the copolymer (A).

Examples of another polymerizable unsaturated monomer include those mentioned above in the preparation of the copolymer (A), more specifically, (meth)acrylic acid esters; vinyl ethers and aryl ethers; olefin compounds and diene compounds; hydrocarbon ring-containing unsaturated monomers; and nitrogen-containing unsaturated monomers.

(B-2): Hydroxyl-containing Polyester Polymer

The hydroxyl-containing polyester polymer for use contains at least one hydroxyl group in the molecule. It is preferable for the polymer to have a number average molecular weight of 1,000 to 10,000. A number average molecular weight of less than 1,000 tends to impair the weatherability of the cured coating, whereas a number average molecular weight exceeding 10,000 tends to reduce the compatibility with the polymer (A). Hence a number average molecular weight of the polymer (B-2) outside said range is undesirable.

The hydroxyl-containing polyester polymer can be easily prepared by condensation reaction of a polyhydric alcohol with a polycarboxylic acid. Useful polyhydric alcohols include, for example, ethylene glycol, butylene glycol, 1,6-hexanediol, trimethylolpropane, pentaerythritol, etc. Useful polycarboxylic acids include, for example, adipic acid, terephthalic acid, isophthalic acid, phthalic anhydride, hexahydrophthalic anhydride, etc. The hydroxyl-containing polyester polymer can be prepared, for example, by a one-step reaction using a reaction system containing excess hydroxyl groups of a polyhydric alcohol.

(B-3) Hydroxyl-containing Particulate Polymer

Suitable for use as the hydroxyl-containing particulate polymer is a nonaqueous dispersion of a hydroxyl-containing particulate polymer as disclosed in Japanese Unexamined Patent Publication No. 95,116/1989. This dispersion is prepared by polymerizing a hydroxyl-containing unsaturated monomer alone or with another polymerizable unsaturated monomer, in an organic liquid in the presence of a dispersion stabilizing resin. The dispersion stabilizing resin used therein is a polymer containing as an essential monomer component a hydrolyzable alkoxysilyl-containing acrylic monomer as exemplified above in the preparation of the copolymer (A). The above particulate polymer in the dispersion is intramolecularly crosslinked by use of the alkoxysilyl-containing acrylic monomer. A polymerizable unsaturated monomer having at least two radically polymerizable unsaturated groups in one molecule can be used in combination with the alkoxysilyl-containing acrylic monomer in order to further intramolecularly crosslink the particulate polymer.

The curing catalyst (C) is a catalyst for curing the composition of the invention by hydrolysis and condensation of methoxysilyl or ethoxysilyl in the copolymer (A). Useful catalysts include acids, for example, sulfuric acid, phosphoric acid and like inorganic acids, p-toluenesulfonic acid, dodecylbenzenesulfonic acid, dinonylnaphthalene sulfonic acid, dinonylnaphthalene disulfonic acid, trichloroacetic acid, trifluoromethanesulfonic acid and like organic acids; monoethanol amine, diethanolamine, triethylamine, tributylamine, 2-aminomethyl propanol and like amine compounds; neutralized products of the acids with the amine compounds; dibutyltin dilaurate, dibutyltin diacetate and like tin catalysts; tetrabutyl titanate and like titanium catalysts, etc.

As essential components of the composition of the invention, the methoxysilyl- and/or ethoxysilyl-containing copolymer (A), hydroxyl-containing resin (B) and curing catalyst (C) are preferably used in the following proportions. The weight ratio of the copolymer (A) to the resin (B) is 5:95 to 80:20, calculated as solids. The proportion of the curing catalyst (C) is 0.1 to 5 parts by weight per 100 parts by weight of the combined amount of the copolymer (A) and the resin (B), calculated as solids. Proportions outside said range tend to reduce the curability and thereby lower the acid resistance and scratch resistance of the coating film, and thus are not preferable. It is more preferable that the weight ratio of the copolymer (A) to the resin (B) be 20:80 to 60:40, calculated as solids, and the proportion of the curing catalyst (C) be 0.2 to 3 parts by weight per 100 parts by weight of the combined amount of the copolymer (A) and the resin (B), calculated as solids.

The composition of the invention may contain an amino resin as an additional curing agent. Useful amino resins include a methylolated amino resin obtained by reaction of aldehyde with an amino component such as melamine, urea, benzoguanamine, acetoguanamine, steroguanamine, spiroguanamine, dicyandiamide and the like. Examples of aldehyde include formaldehyde, paraformaldehyde, acetoaldehyde, benzaldehyde and the like. The methylolated amino resin may be etherified with a suitable alcohol and then used. Examples of alcohols used in etherification include methyl alcohol, ethyl alcohol, n-propyl alcohol, i-propyl alcohol, n-butyl alcohol, i-butyl alcohol, 2-ethyl butanol, 2-ethyl hexanol and the like.

The proportion of the amino resin, if used, is preferably not more than 15 parts by weight per 100 parts by weight of the combined amount of the copolymer (A) and the resin (B), calculated as solids. More than 15 parts by weight of the amino resin is likely to reduce the acid resistance of the coating film and thus is not preferable.

The composition of the invention may contain tris (alkoxycarbonylamino)triazine in view of acid resistance. Preferable alkoxy groups therein are methoxy, ethoxy, propoxy, buthoxy and the like.

When necessary, the composition of the invention may contain dehydrating agents such as trimethyl orthoacetate for preventing the coating composition from degradation caused by moisture in the air or the solvent.

Further, generally known pigments such as coloring pigments, extender pigments, anti-corrosive pigments and the like can be added to the composition of the present invention, when necessary.

Examples of useful coloring pigments are organic pigments such as quinacridone red and like quinacridone pigments, pigment red and like azo pigments, phthalocyanine blue, phthalocyanine green, perylene red and like phthalocyanine pigments; inorganic pigments such as titanium oxide and carbon black; metallic pigments such as aluminum flake, nickel flake, copper flake, brass flake, chrome flake, pearl mica and colored pearl mica.

Further, the composition of the invention may contain conventional additives for coating compositions such as UV absorbers, oxidation inhibitors, surface modifiers, defoaming agents, etc.

The thermosetting coating composition of the invention is usually used in the form of an organic solvent type coating composition. Examples of useful organic solvents include those for coating compositions such as aromatic or aliphatic hydrocarbon solvents; alcohol solvents; ester solvents; ketone solvents; ether solvents, etc. The organic solvent used in preparing the polymers as the components of the composition can be used as it is, or additional organic solvents may be used.

The solids concentration of the composition of the invention is usually as high as about 40 to about 80% by weight, preferably about 45 to about 75% by weight.

The thermosetting coating composition of the invention can be applied to various substrates by conventional coating methods and can be fully cured by usually heating at a temperature of about 100 to about 180° C. for about 10 to about 60 minutes to give a coating film having high resistance to acids and scratch. Presumably, curing of the composition of the invention starts upon formation of silanol groups by hydrolysis of methoxysilyl groups and/or ethoxysilyl groups in the copolymer (A), and the composition is fully cured by self-condensation polymerization of the copolymer (A) or condensation polymerization of the copolymer (A) and the resin (B).

The method for forming a topcoat according to the present invention comprises the step of successively forming a colored base coat and clear coat on a substrate, said base coat and/or clear coat being formed from the thermosetting coating composition of the invention.

The substrates to be used for forming the topcoat include steel panels treated by chemical conversion and electrophoretically coated with a primer and optionally coated with an intercoat; various plastic substrates optionally surface-treated and optionally coated either with a primer or with a primer and an intercoat; substrates produced by a composite of the steel and plastics, etc.

In the method of forming a topcoat according to the invention, the thermosetting coating composition of the invention is used as at least one of the composition for forming the colored base coat and the composition for forming the clear coat.

The thermosetting coating composition of the invention is capable of forming a coating film excellent especially in resistance to acids and scratch and is therefore preferably used as a resin component of the coating composition for forming a clear coat.

The thermosetting coating composition of the invention as such can be used as a clear coat composition. The clear coat composition may contain coloring pigments in an amount that will not completely hide the colored base coat.

The thermosetting coating composition of the invention can be used as a colored base coat composition by properly incorporating therein the organic pigments, inorganic pigments, metallic pigments and like coloring pigments mentioned above.

The method of forming a topcoat according to the invention is particularly suitable for forming a topcoat on automotive exterior panels. The coating methods of the invention include those known in the automotive industry, for example, those comprising forming a colored base coat and a clear coat by 2-coat 1-bake system or 2-coat 2-bake system, and those comprising forming a colored base coat, a clear coat and a clear coat by 3-coat 1-bake system or 3-coat 2-bake system.

The most desirable method of forming a topcoat according to the invention comprises the steps of applying a composition for forming a colored base coat to a substrate, applying a composition for forming a clear coat to the uncured surface of the base coat, and curing the two coats by heating according to 2-coat 1-bake system.

Described below is a coating method by 2-coat 1-bake system using the thermosetting coating composition of the invention as a clear coat composition.

In 2-coat 1-bake system, a colored base coat composition is first applied to the above-mentioned substrate by a conventional coating method such as spray coating or the like.

The colored base coat composition for use may be the thermosetting coating composition of the invention, or may be of the type per se known and conventionally used in a method for forming a topcoat.

Examples of colored base coat compositions per se known include, for example, those comprising a curable resin component and said coloring pigment. Useful curable resin components include, for example, acrylic resin/amino resin mixture, alkyd resin/amino resin mixture, polyester resin/amino resin mixture, acrylic resin/polyisocyanate mixture, alkyd resin/polyisocyanate mixture, polyester resin/polyisocyanate mixture, etc. The amino resins used in said mixtures include melamine resins. The form of these known colored base coat compositions is not specifically limited and can be a desirable type selected from organic solvent type, nonaqueous dispersion type, aqueous dispersion type, aqueous solution type, high solids type, etc.

Application devices for spray coating include those conventionally used, such as an air spray gun, airless spray gun, air spray type electrostatic coater, airless spray type electrostatic coater, rotary atomization type electrostatic coater, etc.

The colored base coat composition is applied preferably to a thickness of about 10 to about 30 μm (when cured). The colored base coat thus deposited is left to stand at room temperature for a few minutes or force-dried at a temperature of about 50 to about 80° C. for a few minutes. The thermosetting coating composition of the invention is then applied as a clear coat composition.

The clear coat composition can be applied in the same manner as in the application of the colored base coat composition using the same application device.

The clear coat composition is applied preferably to a thickness of about 20 to about 80 μm (when cured).

Both the colored base coat and the clear coat thus applied are concurrently cured by heating at about 100 to about 180° C. for about 10 to about 60 minutes.

In the method for forming a topcoat according to the present invention, the composition for forming the colored base coat is preferably an aqueous type, or an organic solvent type having a solids concentration of about 35 to about 65% by weight (when applied by spray coating). The composition for forming the clear coat is preferably of an organic solvent type having a solids concentration of about 45 to about 75% by weight (when applied by spray coating).

The articles coated by the coating method of the invention have a coating film excellent in resistance to acids and scratch, and the coating film thus formed is particularly suitable for covering automotive exterior panels.

BEST MODE FOR CARRYING OUT THE INVENTION

The present invention is described below in more detail with reference to Examples wherein the parts and percentages are all by weight.

PREPARATION EXAMPLE 1

Preparation of Methoxysilyl- and Alkyletherified N-methylol-containing Copolymer (a-1)

300 parts of xylene, 500 parts of butyl acetate and 200 parts of n-butanol were fed into a 5-liter glass flask equipped with a stirrer, a thermometer and a condenser tube, and heated to 120° C. using an electric mantle. While the mixture was maintained at this temperature, a mixture having the following composition was added dropwise at a constant rate over a period of 4 hours.

| | |
|---|---|
| Vinyltrimethoxylsilane | 400 parts |
| Ethyl acrylate | 500 parts |
| N-methylolacrylamide butyl ether | 100 parts |
| t-Butylperoxyisopropyl carbonate | 20 parts |

The reaction mixture was aged for 30 minutes, and 10 parts of t-butylperoxyisopropyl carbonate was added dropwise over a period of 2 hours, followed by aging for 1 hour. The solvent was removed under reduced pressure to concentrate the solution until the resin solids content became 70%, thus giving a solution of copolymer (a-1). The solution had a Gardner viscosity of A (at 25° C.). The copolymer (a-1) obtained had a number-average molecular weight of 1,500 and a methoxysilyl content of 2.7 mmol/g.

PREPARATION EXAMPLE 2

Preparation of Hydroxyl-containing Resin (b-1)

600 parts of xylene and 70 parts of n-butanol were fed into a 5-liter glass flask equipped with a stirrer, a thermometer and a condenser tube, and heated to 120° C. using an electric mantle. While the mixture was maintained at this temperature, a mixture having the following composition was added dropwise at a constant rate over a period of 4 hours.

| | |
|---|---|
| Styrene | 200 parts |
| n-Butyl methacrylate | 300 parts |
| 2-Ethylhexyl methacrylate | 260 parts |
| 2-Hydroxyethyl methacrylate | 230 parts |
| Acrylic acid | 10 parts |
| Azobisisobutyronitrile | 40 parts |

The reaction mixture was aged for 30 minutes and 5 parts of azobisisobutyronitrile was added dropwise over a period of 2 hours. The mixture was aged for 1 hour, giving a solution of a hydroxyl-containing resin (b-1). The solution had a Gardner viscosity of V (at 25° C.) and a resin solids content of 60%. The hydroxyl-containing resin (b-1) had a number-average molecular weight of 5,000 and a hydroxyl value of 100 mg KOH/g.

PREPARATION EXAMPLE 3

Preparation of Nonaqueous Dispersion of Hydroxyl-containing Particulate Polymer (b-2)

(1) Preparation of Dispersion Stabilizing Resin 1,000 parts of xylene was heated to 120° C., and the following monomers and polymerization initiator were added dropwise over a period of 3 hours. After completion of the dropwise addition, the resulting mixture was aged for 2 hours.

| | |
|---|---|
| γ-Methacryloxypropyltrimethoxysilane | 50 parts |
| 2-Hydroxylethyl acrylate | 100 parts |
| Styrene | 100 parts |
| n-Butyl methacrylate | 250 parts |
| 2-Ethylhexyl methacrylate | 250 parts |
| Lauryl methacrylate | 250 parts |
| Azobisisobutyronitrile | 40 parts |

The acrylic resin varnish obtained had a nonvolatile content of 50% and a Gardner viscosity (25° C.) of B. The acrylic resin had a weight average molecular weight of about 10,000.

(2) Preparation of Nonaqueous Dispersion of Crosslinked Particulate Polymer 1,000 parts of heptane and 1,000 parts of the dispersion stabilizing resin were placed into a flask and refluxed by heating. The following monomers and polymerization initiator were added dropwise over a period of 3 hours.

| | |
|---|---|
| Styrene | 100 parts |
| Acronitrile | 150 parts |
| 2-Hydroxylethyl acrylate | 200 parts |
| Methyl methacrylate | 550 parts |
| Azobisisobutyronitrile | 10 parts |

The mixture was aged for 2 hours, giving a nonaqueous dispersion of crosslinked particulate polymer (b-2) having a solids concentration of 50%.

The dispersion obtained had a Gardner viscosity (25° C.) of A1, and the particulate polymer had a particle diameter of 300 nm (as measured with "Nanosizer N-4", tradename, product of Coulter Co., Ltd.). The hydroxyl-containing particulate polymer (b-2) had a hydroxyl value of 96.7 mg KOH/g.

PREPARATION EXAMPLE 4

Preparation of Organic Solvent Type Metallic Base Coat Composition (Y-1)

(1) Preparation of Hydroxyl-containing Acrylic Resin 30 parts of methyl methacrylate, 59 parts of ethyl acrylate, 10 parts of 2-hydroxyethyl acrylate and 1 part of acrylic acid were polymerized in a mixed solvent of xylene and n-butanol (70:30, weight ratio) at 100° C. using azobisisobutyronitrile as a polymerization initiator, thus giving a hydroxyl-containing acylic resin with a resin solids content of 50%. The resin had a weight average molecular weight of 25,000.

(2) Preparation of Coating Composition (Y-1)

| | |
|---|---|
| 50% hydroxyl-containing acrylic resin solution obtained above | 110 parts |
| 88% "CYMEL 370" | 28 parts |
| 20% CAB solution | 100 parts |
| Aluminum paste | 20 parts |

A mixture of the above components was adjusted to a viscosity of 13 seconds (Fordcup #4/20° C.) with a solvent mixture consisting of 30 parts of toluene, 20 parts of isobutyl alcohol, 30 parts of cellosolve acetate and 20 parts of "SWASOL 1000" (tradename, product of Cosmo Oil Co., Ltd., hydrocarbon solvent), giving an organic solvent type coating composition (Y-1). The composition had a nonvolatile content of about 40%.

Referring to the above components, 88% "CYMEL 370" (tradename, product of Mitsui Cyanamide Co., Ltd.) is a partially methyl-etherified melamine resin that has a resin solids content of 88% in isopropanol. 20% CAB solution is a 20% solution of cellulose acetate butyrate in a mixed solvent of toluene and n-butyl acetate (50:50, weight ratio). Aluminum paste is "Aluminum Paste #55-519" (tradename, product of Toyo Aluminum Co., Ltd., metallic pigment).

PREPARATION EXAMPLE 5

Preparation of Aqueous Metallic Base Coat Composition (M-1)

(1) Preparation of Aqueous Dispersion of Acrylic Resin (W-1)

A reactor was charged with 140 parts of deionized water, 2.5 parts of 30% "NEWCOL 707SF" (tradename, product of Nihon Nyukazai Co., Ltd., surfactant) and 1 part of the monomer mixture (i) shown below. The mixture was stirred in a nitrogen stream. A monomer emulsion consisting of 4 parts of 3% ammonium persulfate and 42 parts of deionized water was placed dropwise into the reactor over a period of 4 hours using a metering pump. After the addition, the mixture was aged for 1 hour.

| Monomer mixture (i) | |
|---|---|
| Methyl methacrylate | 55 parts |
| Styrene | 10 parts |
| n-Butyl acrylate | 9 parts |
| 2-Hydroxyethyl acrylate | 5 parts |
| Methacrylic acid | 1 part |

Then, 20.5 parts of the monomer mixture (ii) shown below and 4 parts of 3% ammonium persulfate were concurrently added dropwise into the reactor at 80° C. over a period of 1.5 hours. After the addition, the mixture was aged for 1 hour and filtered at 30° C. through a 200-mesh nylon cloth filter. Deionized water was added, and the mixture was adjusted to pH 7.5 with dimethylaminoethanol, giving an aqueous dispersion of acrylic resin (W-1) having an average particle diameter of 0.1 μm, a glass transition temperature (Tg) of 46° C. and a nonvolatile content of 20%.

| Monomer mixture (ii) | |
|---|---|
| Methyl methacrylate | 5 parts |
| n-Butyl acrylate | 7 parts |
| 2-Ethylhexyl acrylate | 5 parts |
| Methacrylic acid | 3 parts |
| 30% "Newcol 707SF" | 0.5 part |

(2) Preparation of Aqueous Solution of Acrylic Resin (W-2)

A reactor was charged with 60 parts of butyl cellosolve and 15 parts of isobutyl alcohol. The mixture was heated to 115° C. in a nitrogen stream. At a temperature of 115° C., there was added a mixture of 26 parts of n-butyl acrylate, 47 parts of methyl methacrylate, 10 parts of styrene, 10 parts of 2-hydroxyethyl methacrylate, 6 parts of acrylic acid and 1 part of azobisisobutyronitrile over a period of 3 hours. After the addition, the mixture was aged at 115° C. for 30 minutes. A mixture of 1 part of azobisisobutyronitrile and 115 parts of butyl cellosolve was added dropwise over a period of 1 hour, followed by aging for 30 minutes. The mixture was filtered at 50° C. through a 200-mesh nylon cloth filter. The reaction product had an acid value of 48 mg KOH/g, a viscosity (Gardner bubble viscometer) of Z4, a nonvolatile content of 55% and a Tg of 45° C. The product was subjected to equivalent neutralization using dimethylaminoethanol. Then deionized water was added, giving an aqueous solution of acrylic resin (W-2) having a nonvolatile content of 50%.

(3) Preparation of Aqueous Metallic Base Coat Composition (M-1)

| | |
|---|---|
| Aqueous dispersion of acrylic resin (W-1) | 275 parts |
| Aqueous solution of acrylic resin (W-2) | 40 parts |
| "CYMEL 350" (tradename, product of Mitsui Toatsu Chemicals Inc., fully methyl etherified melamine resin) | 25 parts |
| "ALUMINUM PASTE AW-500B" (tradename, product of Asahi Chemical Metals Co., Ltd., metallic pigment) | 20 parts |

-continued

| | |
|---|---|
| Butyl cellosolve | 20 parts |
| Deionized water | 253 parts |

"THIXOL K-130B" (tradename, product of Kyoeisha Yushi Kagaku Kogyo KK, thickener) was added to the mixture of the above components to adjust the mixture to a viscosity of 3,000 cps as measured with a Brookfield viscometer (rotor revolution speed 6 rpm), giving an aqueous metallic coating composition (M-1) having a nonvolatile content of about 19%.

Examples 1–3 and Comparative Examples 1–2

Coating compositions of the present invention and comparative coating compositions were prepared in the following manner. A solution of a mixed resin having the composition (parts by weight, on a solid basis) shown in Table 1 was prepared. Added thereto were 1 part of "TINUVIN 900" (tradename, product of Ciba-Geigy, ultraviolet absorber) and 0.1 part of "BYK-300" (tradename, product of BYK-Chemie Co., surface modifier). The mixture was diluted with "SWASOL 1000" (tradename, product of Cosmo Oil Co., Ltd., hydrocarbon solvent) for adjustment to a viscosity of 25 seconds (Ford cup #4/20° C). Table 1 also shows solids concentrations (%) of the coating compositions (when applied).

The compositions thus obtained were tested for storage stability by the following method.

Storage stability: The composition was diluted with "SWASOL 1000" to a viscosity of 30 seconds (Ford cup #4/20° C.). A 300 g portion of the diluted composition was placed into a beaker which was then loosely covered with aluminum foil. The composition was stored at 40° C. for 2 weeks, and its viscosity (Ford cup #4/20° C.) was measured to check the degree of thickening. The composition was evaluated according to the following criteria:

A: viscosity not more than 50 seconds (good storage stability),
B: viscosity not more than 70 seconds (slightly lower storage stability),
C: viscosity more than 70 seconds (poor storage stability).
Table 1 shows the test results.

TABLE 1

| | Example | | | Comparative Example | |
|---|---|---|---|---|---|
| Component | 1 | 2 | 3 | 1 | 2 |
| Copolymer (A) a-1 | 40 | 40 | 40 | | 100 |
| Hydroxyl-containing resin (B) | | | | | |
| b-1 | 60 | 40 | 40 | 100 | |
| b-2 | | 20 | 20 | | |
| Curing catalyst (C) DDBSA/AMP | 2 | 2 | 2 | 2 | 2 |
| Amino resin "CYMEL 303" | | | 10 | 65 | 65 |
| Solids concentration (%) | 56 | 63 | 57 | 55 | 66 |
| Storage stability | A | A | A | A | A |

In Table 1, "DDBSA/AMP" used as curing catalyst (C) is a neutralized product of dodecyl benzene sulfonic acid with an equivalent amount of 2-aminomethyl propanol. "CYMEL 303" used as amino resin is a fully methyl etherified melamine resins (tradename, product of Mitsui Toatsu Chemicals Inc.,).

Examples 4–9 and Comparative Examples 3–6

Topcoats were formed by the following method according to 2-coat 1-bake system using the coating compositions obtained in Examples 1 to 3 and Comparative Examples 1 to 2 as clear coat compositions.

Test substrates were prepared in the following manner. A dull steel panel of 0.8 mm thickness treated by chemical conversion with zinc phosphate was coated with an epoxy-based cationic electrodepositable coating composition to give a coating film of about 20 μm thickness (when dried). The coated panel was baked at 170° C. for 20 minutes, polished with sand paper (#400), and degreased by wiping with petroleum benzine. The coated panel was further coated by air spray coating with an automotive intercoating surfacer to give a coating film of about 25 μm thickness (when dried). The coated panel was baked at 140° C. for 30 minutes, subjected to wet rubbing with sand paper (#400), dehydrated for drying, and degreased by wiping with petroleum benzine, giving a test substrate.

The metallic base coat compositions obtained in Preparation Examples 4 and 5 were applied to the test substrates to a thickness of 20 μm (when cured). The substrates coated with the base coat composition (Y-1) were left to stand at room temperature for 5 minutes, whereas those coated with the base coat composition (M-1) were force-dried at 80° C. for 10 minutes. The clear coat compositions prepared in Examples 1–3 and Comparative Examples 1–2 were then applied to the coated test substrates to give a coating film of 40 μm thickness (when cured). The coated panels were heated at 140° C. for 30 minutes, whereby the two coats were cured to form a topcoat.

The topcoats thus formed were tested for properties as follows.

Film appearance: The metallic effect (brilliancy, whiteness and the like) was visually evaluated on the following scale:

A: excellent in metallic effect,
B: poor in metallic effect,
C: exceedingly poor in metallic effect.

Acid resistance: A half area of the coated test panel was immersed in a 40% solution of sulfuric acid. Then, the coated panel was left to stand at 50° C. for 5 hours, followed by washing with water. The surface of coated panel was visually inspected and evaluated on the following scale:

A: no change,
B: substantially no change in the coating surface but a slight difference in film thickness between the immersed portion and unimmersed portion,
C: blushing on the coating surface.

Scratch resistance: An automobile with the coated test panel attached to the roof was washed 15 times in a car washer, and the surface of the coated test panel was visually inspected. The car washer was a product of Yasui Sangyo Co., Ltd. available under the tradename "PO 20F WRC". The results were evaluated on the following scale:

A: substantially no scratch mark was found on the coating surface,
B: slight scratch marks were found but to a negligible extent,
C: noticeable scratch marks were found.

Impact resistance: The coated panel was tested with a Du Pont impact tester using a weight of 500 g with a tip 0.5 inch in radius. The results were evaluated in terms of the maximum height (5 cm calibration) at which no cracking was caused by the weight dropped onto the coated panel.

Water resistance: The coated panel was dipped in warm water maintained at 40° C. for 240 hours and washed with water, followed by visual inspection of the coating surface. The results were evaluated on the following scale:

A: no change,

B: slight dulling on the coating surface,

C: blushing on the coating surface.

Recoat adhesion: A first topcoat was formed by the above method according to 2-coat 1-bake system. Then the topcoating compositions (base coat composition and clear coat composition) used in the first topcoat were applied to the coated panel in the same manner, and baked at 120° C. for 30 minutes to make a second topcoat. The coated panel was cut crosswise to reach the substrate, giving 100 squares with a spacing of 1 mm. An adhesive cellophane tape was applied to and then peeled from the cut surface. The adhesion between the first and the second topcoats was evaluated on the following scale:

A: no peeling,

B: slightly peeled,

C: considerably peeled.

Table 2 shows the test results.

TABLE 2

| | | Example | | | | | | Comparative Example | | |
|---|---|---|---|---|---|---|---|---|---|---|---|
| | | 4 | 5 | 6 | 7 | 8 | 9 | 3 | 4 | 5 | 6 |
| Base coat composition | | Y-1 | Y-1 | Y-1 | M-1 | M-1 | M-1 | Y-1 | Y-1 | M-1 | M-1 |
| Clear coat composition | | Ex.1 | Ex.2 | Ex.3 | Ex.1 | Ex.2 | Ex.3 | Comp. Ex.1 | Comp. Ex.2 | Comp. Ex.1 | Comp. Ex.2 |
| Performance | Film appearance | A | A | A | A | A | A | A | C | A | C |
| | Acid resistance | A | A | A | A | A | A | C | C | C | C |
| | Scratch resistance | A | A | A | A | A | A | A | C | A | C |
| | Impact resistance | 50 | 50 | 50 | 50 | 50 | 50 | 50 | 50 | 50 | 50 |
| | Water resistance | A | A | A | A | A | A | A | C | A | C |
| | Recoat adhesion | A | A | A | A | A | A | A | C | A | C |

The present invention achieves the following remarkable effects. There is provided a novel thermosetting high solids coating composition that can form a coating film excellent in both acid resistance and scratch resistance and is superior in storage stability and recoat adhesion. Further provided is a method for forming a topcoat using said composition.

What is claimed is:

1. A thermosetting high solids coating composition comprising:
   (A) a copolymer prepared by polymerizing monomer components comprising (a) 30 to 50 wt. % of vinyltrimethoxysilane and/or vinyltriethoxysilane, (b) 5 to 15 wt. % of N-methylol(meth)acrylamide alkyl ether and (c) 35 to 65 wt. % of another polymerizable unsaturated monomer,
   (B) a hydroxyl-containing resin having a hydroxyl value of 10 to 200 mg KOH/g, and
   (C) a curing catalyst.

2. The composition according to claim 1 which is of an organic solvent and has a solids concentration of about 40 to about 80% by weight.

3. The composition according to claim 1 wherein the copolymer (A) has a methoxysilyl and/or ethoxysilyl content of 0.5 to 4.0 mmol/g.

4. The composition according to claim 1 wherein the copolymer (A) has a number average molecular weight of 1,000 to 5,000.

5. The composition according to claim 1 wherein the polymerizable unsaturated monomer (c) in the copolymer (A) is a $C_{1-24}$ alkyl ester or cycloalkyl ester of acrylic or methacrylic acid.

6. The composition according to claim 1 wherein the resin (B) is a hydroxyl-containing acrylic polymer and/or a hydroxyl-containing polyester polymer.

7. The composition according to claim 6 wherein the hydroxyl-containing acrylic polymer is a particulate polymer prepared by polymerizing a hydroxyl-containing unsaturated monomer alone or with another polymerizable unsaturated monomer, in an organic liquid in the presence of a dispersion stabilizing resin which is a polymer containing a hydrolyzable alkoxylsilyl-containing acrylic monomer as an essential monomer component.

8. The composition according to claim 1 wherein the curing catalyst (C) is an acid catalyst or a neutralized catalyst of an acid with an amine compound.

9. The composition according to claim 1 wherein the weight ratio of the copolymer (A) to the resin (B) is 5:95 to 80:20, calculated as solids, and the proportion of the curing catalyst (C) is 0.1 to 5 parts by weight per 100 parts by weight of the combined amount of the copolymer (A) and the resin (B), calculated as solids.

10. A method for forming a topcoat comprising the step of successively forming a colored base coat and a clear coat on a substrate, said colored base coat and/or clear coat being formed from the coating composition defined in claim 1.

11. The method for forming a topcoat according to claim 10, the method comprising the steps of applying the composition for forming the colored base coat to a substrate, applying the composition for forming the clear coat to the uncured surface of the base coat, and curing the two coats by heating according to 2-coat 1-bake system.

12. The method for forming a topcoat according to claim 10 wherein the composition for forming the clear coat is a coating composition comprising:

a copolymer prepared by polymerizing monomer components comprising (a) 30 to 50 wt. % of vinyltrimethoxysilane and/or vinyltriethoxysilane, (b) 5 to 15 wt. % of N-methylol(meth)acrylamide alkyl ether and (c) 35 to 65 wt. % of another polymerizable unsaturated monomer;

(B) a hydroxyl-containing resin having a hydroxyl value of 10 to 200 mg KOH/g, and (C) a curing catalyst.

13. An article coated by the method according to claim 10.

* * * * *

UNITED STATES PATENT AND TRADEMARK OFFICE
CERTIFICATE OF CORRECTION

PATENT NO. : 6,261,642 B1
DATED : July 17, 2001
INVENTOR(S) : Nagai et al.

It is certified that error appears in the above-identified patent and that said Letters Patent is hereby corrected as shown below:

<u>Title page,</u>
On the title page insert: -- (30) Foreign Application Priority Data
July 8, 1997 (JP) ............ 182304/1997 --

Signed and Sealed this

Eleventh Day of June, 2002

Attest:

Attesting Officer

JAMES E. ROGAN
*Director of the United States Patent and Trademark Office*